(12) United States Patent
Kim

(10) Patent No.: US 7,941,177 B2
(45) Date of Patent: May 10, 2011

(54) WIRELESS TERMINAL APPARATUS FOR AUTOMATICALLY CHANGING WLAN STANDARD AND METHOD THEREOF

(75) Inventor: Jin-Hyung Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 434 days.

(21) Appl. No.: 11/225,343

(22) Filed: Sep. 14, 2005

(65) Prior Publication Data

US 2006/0058059 A1    Mar. 16, 2006

(30) Foreign Application Priority Data

Sep. 15, 2004    (KR) .......................... 10-2004-0073742
Sep. 23, 2004    (KR) .......................... 10-2004-0076270

(51) Int. Cl.
     *H04W 36/00*      (2009.01)
(52) U.S. Cl. ................ 455/552.1; 455/550.1; 455/553.1; 370/328; 370/338
(58) Field of Classification Search .................. 455/41.2, 455/74, 422.1, 426.1, 425, 432.2, 434, 435.2, 455/550.1, 552.1, 553.1, 560; 370/245, 252, 370/254, 338
See application file for complete search history.

(56) References Cited

U.S. PATENT DOCUMENTS

| | | | |
|---|---|---|---|
| 6,119,003 A | | 9/2000 | Kukkohovi |
| 7,046,649 B2 * | | 5/2006 | Awater et al. ................. 370/338 |
| 7,277,409 B1 * | | 10/2007 | Thermond et al. ............ 370/328 |
| 2002/0176366 A1 * | | 11/2002 | Ayyagari et al. .............. 370/245 |
| 2002/0187780 A1 | | 12/2002 | Souissi |
| 2004/0038660 A1 | | 2/2004 | He et al. |
| 2004/0063458 A1 * | | 4/2004 | Hori et al. ................... 455/554.2 |
| 2004/0090924 A1 * | | 5/2004 | Giaimo et al. ................ 370/252 |
| 2004/0125778 A1 * | | 7/2004 | Lin et al. ...................... 370/338 |
| 2004/0127214 A1 | | 7/2004 | Reddy et al. |
| 2004/0243840 A1 * | | 12/2004 | Tran .............................. 713/201 |
| 2005/0185671 A1 * | | 8/2005 | Hansen et al. ................ 370/466 |

FOREIGN PATENT DOCUMENTS

| | | |
|---|---|---|
| CN | 1375772 A | 10/2002 |
| EP | 1 119 137 | 7/2001 |
| JP | 2002-345027 | 11/2002 |
| KR | 2001-0049221 | 6/2001 |
| KR | 2004-0020725 | 3/2004 |
| KR | 2004-0037420 | 5/2004 |
| KR | 102-2004-0053858 | 6/2004 |
| WO | WO 03/100647 | 12/2003 |

\* cited by examiner

*Primary Examiner* — Jean A Gelin
(74) *Attorney, Agent, or Firm* — Roylance, Abrams, Berdo and Goodman L.L.P.

(57) ABSTRACT

A wireless terminal apparatus having a Wireless Local Area Network (WLAN) standard automatic change function and method thereof are provided. The wireless terminal apparatus comprises a memory for storing information of a condition change, a wireless communication module for communicating with a predetermined correspondent node according to a first WLAN standard, a communication status detection unit for detecting a communication status of the wireless communication module and determining whether an event occurs satisfying the condition for change, and a central processing unit, changing the first WLAN standard to a second WLAN standard and establishing a communication link. An optimum WLAN standard can be established and a communication is performed according to the WLAN standard.

21 Claims, 9 Drawing Sheets

WIRELESS TERMINAL APPARATUS FOR AUTOMATICALLY CHANGING WLAN STANDARD AND METHOD THEREOF

CROSS-REFERENCE TO RELATED APPLICATIONS

This application claims the benefits under 35 U.S.C. §119(a) of Korean Patent Applications Nos. 2004-76270, filed on Sep. 23, 2004, and 2004-73742, filed on Sep. 15, 2004, the entire contents of which are hereby incorporated by reference.

BACKGROUND OF THE INVENTION

1. Field of the Invention

The present invention relates to a wireless terminal device performing a wireless network communication function and a method thereof. More particularly, the present invention relates to a wireless terminal device which supports a plurality of Wireless Local Area Network (WLAN) standards, which are incorporated herein by reference, selects a standard that is most appropriate to a current communication environment, and performs a wireless network communication function according to the selected standard, and a method thereof.

2. Description of the Related Art

A high-speed wireless network, which establishes a network environment by using waves or light instead of a cable, has been increasingly utilized in many areas. Since the wireless network requires no cable distributing work, it can facilitate a network establishment. Also, since it is operated at broadband radio wave (2.4 GHz, 5 GHz), it is possible to transmit data at high rate of 11 Mbps to 54 Mbps. A method for establishing the wireless network comprises an ad-hoc method as used in transmitting data among laptop computers through a wireless LAN card only, and an infrastructure method which uses an access point (AP) to connect to a wired network.

FIG. 1A is a view illustrating a wireless network system which adopts the ad-hoc method for communication. As shown in FIG. 11A, respective wireless nodes, such as a PC 11, a laptop computer 12, and a multi-function peripheral device 13, directly communicate to one another without passing though an extra central management device.

FIG. 1B is a view illustrating a wireless network system which adopts the infrastructure method for communication. Referring to FIG. 1B, a wired infrastructure, in which respective nodes 21, 22, 23 such as PCs and a server are connected to one another via wires, further comprises an access point (AP) 20. The AP 20 is a device that connects wireless nodes such as a laptop computer, a PC, a multi-function peripheral device to a wired infrastructure. Accordingly, the respective wireless nodes 30, 40 indirectly communicate with each other through the AP.

Communications among the respective wireless nodes of the ad-hoc method and communications between the AP and the respective wireless node of the infrastructure method are performed according to various WLAN standards. The WLAN standards, the entire contents of which are herein incorporated by reference, are largely classified into the IEEE 802.11 standard as used in the U.S.A., hyper LAN standard as used in Europe, and the MMAC-PC standard as used in Japan. Among these standards, the IEEE 802.11 standard is popular in the U.S.A. and Asia, and is classified into 802.11, 802.11a, 802.11b and 802.11g.

A user of a terminal device, which supports the wireless network function, sets a predetermined communication profile to perform a communication according to a predetermined WLAN standard. The communication profile comprises a Service Set Identification (SSID), an operation mode, a channel type, and security information. The terminal device selects one of the above-described WLAN standards based on the set profile to perform the communication.

If a wireless terminal device supports both the ad-hoc method and the infrastructure method, a user selects an operation mode and selectively adopts the two methods. However, the conventional wireless terminal device still maintains a current WLAN standard although the operation mode is changed. In this case, if the wireless terminal device is situated in an environment where various APs coexist to support different WLAN standards or a single AP supports different WLAN standards exists, frequency interference among the WLAN standards occurs. To this end, noises occur and thus a communication condition deteriorates. Also, a radio frequency resource is ineffectively utilized.

Also, changes occur in a network environment due to a newly set communication profile, but a conventional wireless terminal device maintains a current WLAN standard, and thus, it cannot be operated smoothly. Even if the wireless terminal device is designed to support a different WLAN standard, a user has to directly search for a current communicable standard and update the profile.

SUMMARY OF THE INVENTION

The present invention has been developed to address the above problems. Accordingly, an aspect of the present invention is to provide a wireless terminal device and method thereof, which change a wireless Local Area Network (LAN) standard according to a surrounding network condition when a communication mode changes, thereby preventing an interference from occurring with another wireless terminal device.

Another aspect of the present invention is to provide a wireless terminal device and a method thereof capable of automatically selecting the most appropriate Wireless Local Area Network (WLAN) standard to a current communication status, thereby allowing a user to establish an optimal communication environment.

According to an exemplary embodiment of the present invention to achieve the above aspect, a wireless terminal device is provided. The wireless terminal device comprises a wireless communication module for establishing a communication link with respect to a certain corresponding node in one of an ad-hoc mode and an infrastructure mode and performing a communication with the correspondent node, and a central processing unit for controlling the wireless communication module such that, if an operation mode of the wireless communication mode is changed, a first WLAN standard, which was used before the mode change, is changed to a second WLAN standard, and the communication link is established according to the second WLAN standard.

According to an exemplary implementation, the central processing unit searches for a standard from a plurality of WLAN standards that uses a different frequency band from that of the first WLAN standard and applies results of the searched standard to the second WLAN standard.

According to an exemplary implementation, the wireless terminal device further comprises a key input receiving unit for inputting a mode selection signal to select one of the ad-hoc mode and the infrastructure mode.

According to an exemplary implementation, the wireless terminal device further comprises an output unit for displaying a user interface window through which communication profile information about the plurality of WLAN standards is input, and a memory for storing the communication profile information input through the user interface window.

According to an exemplary implementation, if a certain operation mode is selected by the mode selection signal, the central processing unit determines a WLAN standard used in a network located within a communicable range of the wireless communication module, and applies a different standard from the determined WLAN standard for the second WLAN standard.

According to an exemplary embodiment of the present invention, a method is provided for communicating with a certain correspondent node in a predetermined operation mode in a wireless communication. The method comprises the steps of determining whether the operation mode is changed, determining a first WLAN standard which was used before the operation mode change if the operation mode is changed, and applying a second WLAN standard different from the first WLAN standard, establishing a communication link according to the second WLAN standard and performing a communication.

According to an exemplary implementation, the step of applying further comprises searching for a standard from a plurality of WLAN standards that uses a different frequency band from that of the first WLAN standard, and employing the searched standard for the second WLAN standard.

According to an exemplary implementation, the method further comprises the steps of displaying a user interface window for inputting communication profile information about the plurality of WLAN standards, and storing the communication profile information input through the user interface window.

According to an exemplary implementation, the step of applying further comprises retrieving communication profile information for the second WLAN standard, and establishing a communication link according to the second WLAN standard based on the retrieved communication profile.

According to an exemplary implementation, the method further comprises the steps of receiving a mode selection signal for selecting one of an infrastructure mode and an ad-hoc mode, determining a WLAN standard for a network existing in a communicable range of the wireless terminal device, and employing a different standard from the determined WLAN standard for the second WLAN standard.

According to an exemplary embodiment of the present invention, a wireless terminal apparatus is provided for communicating with a certain correspondent node in a predetermined operation mode in a wireless communication system. The wireless terminal device comprises a memory for storing information of communication profiles for a plurality of WLAN standards and information of a condition change, a wireless communication module for communicating with a predetermined correspondent node according to a first WLAN standard, and a communication status detection unit for detecting a communication status of the wireless communication module and determining whether an event occurs satisfying the condition for change. If the communication status detection unit determines that the event occurs, the wireless communication module changes the first WLAN standard into a second WLAN standard and communicates according to the second WLAN standard.

According to an exemplary implementation, the wireless terminal device further comprises an input unit for inputting the information of the communication profiles and the information of the condition for change.

According to an exemplary implementation, the wireless terminal device further comprises a central processing unit for searching for the second WLAN standard among the plurality of WLAN standards, retrieving communication profiles for the searched second WLAN standard from the memory, and controlling the wireless communication module based on the retrieved communication profiles to communicate according to the second WLAN standard.

According to an exemplary implementation, if a communication link off (LINK OFF) condition is selected as the condition for change, the central processing unit searches for a communicable second WLAN standard among the plurality of WLAN standards when the communication LINK OFF condition is satisfied.

According to an exemplary implementation, if a low transmission rate is selected as the condition for change and is less than a reference rate, the central processing unit searches for a second WLAN standard from the plurality of WLAN standards that supports a transmission rate greater than the reference rate.

According to an exemplary implementation, if a time change condition is selected as the condition for change and a time is changed, the central processing unit changes the first WLAN standard into a second WLAN standard designated for a current time according to information about WLAN standards respectively designated for different times.

According to an exemplary implementation, the wireless terminal device further comprises an output unit for displaying a user interface window for setting the information of the communication profiles and the information of the condition for change.

According to an exemplary embodiment of the present invention, a method for communicating in a wireless terminal device is provided. The method comprises the step of performing a wireless communication with a predetermined correspondent node according to a first WLAN standard, detecting a wireless communication status and determining whether an event occurs satisfying a predetermined condition for change, and changing the first WLAN standard into a predetermined second WLAN standard if the event occurs and performing a wireless communication according to the second WLAN standard.

According to an exemplary implementation, the step of changing comprises retrieving out communication profiles for the second WLAN standard, and performing a wireless communication according to the second WLAN standard based on the retrieved communication profile information.

According to an exemplary implementation, the method further comprises the steps of receiving and storing information of communication profiles for the plurality of WLAN standards and information of the condition for change.

According to an exemplary implementation, the information of the communication profiles comprises at least one of service set identification (SSID), WLAN standard information, operation mode information, authentication information and encryption information.

According to an exemplary implementation, the reference for change may be determined to be one of a link off condition, a low transmission rate condition and a time change condition.

BRIEF DESCRIPTION OF THE DRAWINGS

The above aspects and other advantages of the present invention become apparent by describing exemplary embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will now be described in greater detail with reference to the accompanying drawings.

Figure 1A:
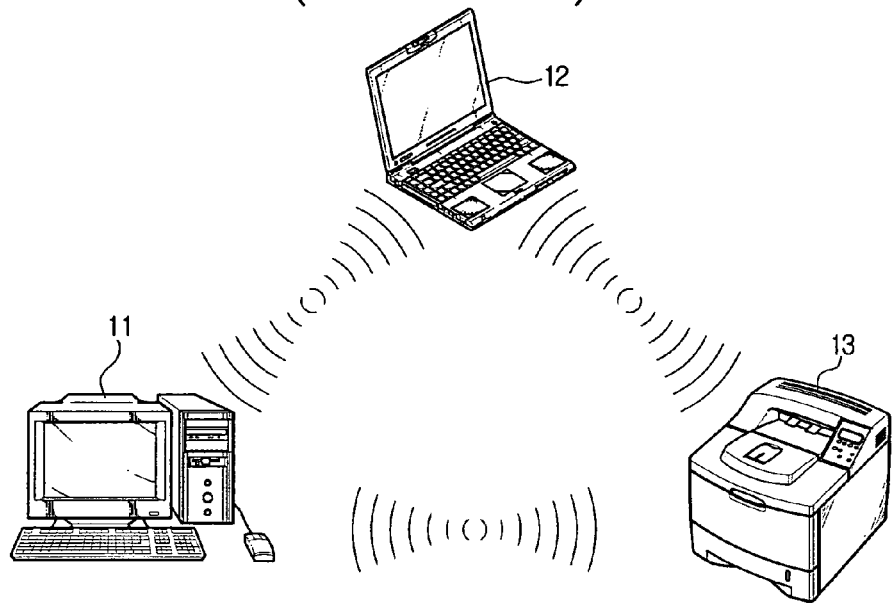
FIG. 1A is a view illustrating a conventional structure of a wireless network environment according to an Ad-hoc method.
Figure 1B:
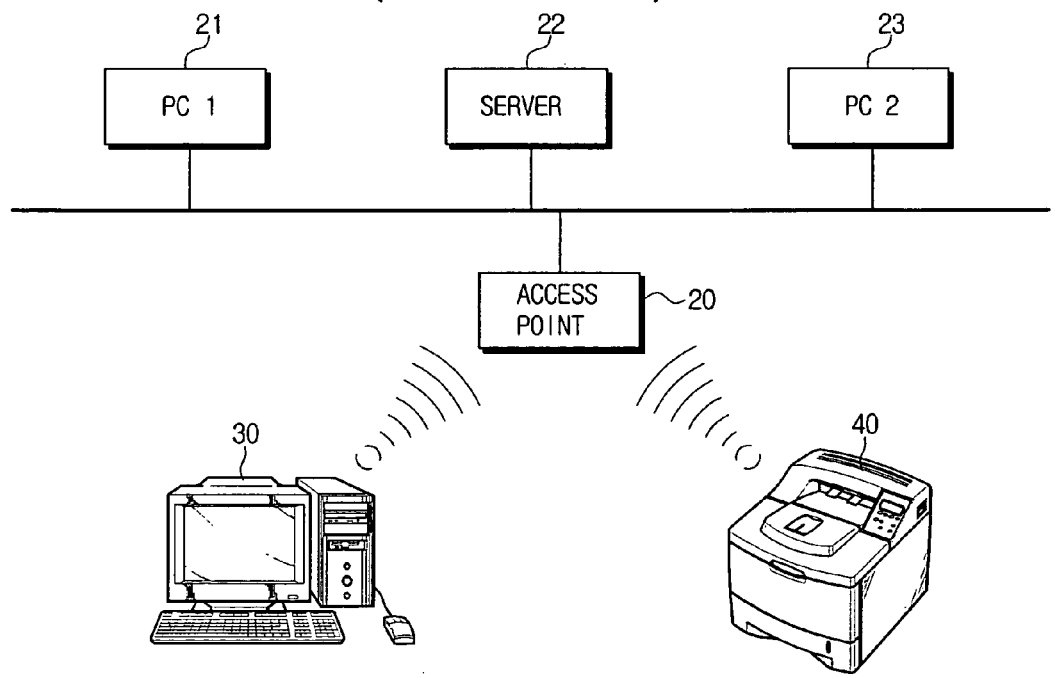
FIG. 1B is a view illustrating a structure of a wireless network environment according to an infrastructure method.
Figure 2:
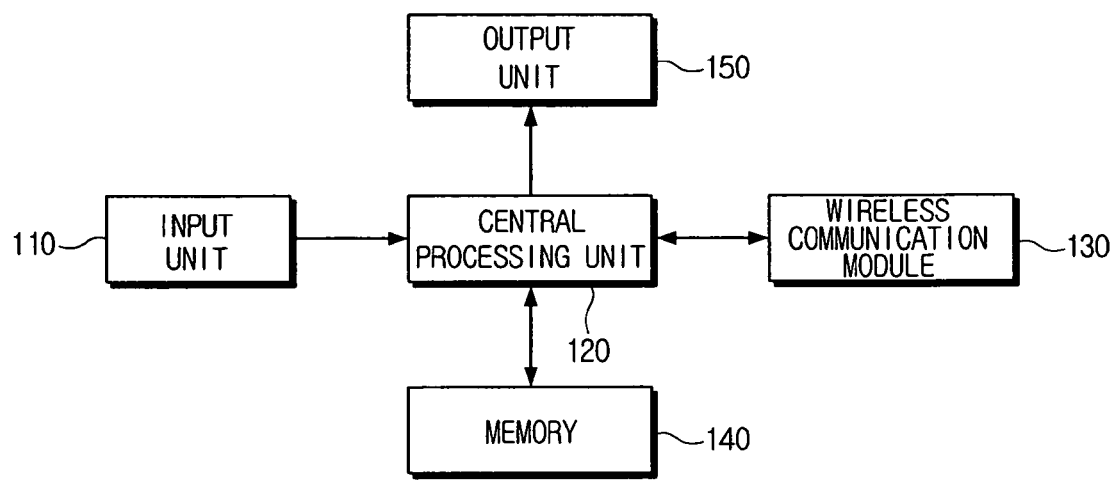
FIG. 2 is a block diagram illustrating a wireless terminal device according to an exemplary embodiment of the present invention.

FIG. 2 is a block diagram illustrating a wireless terminal device according to an exemplary embodiment of the present invention. Referring to FIG. 2, a wireless terminal device according to an exemplary embodiment of the present invention comprises an input unit 110, a central processing unit 120, a wireless communication module 130, a memory 140, and an output unit 150.

The wireless communication module 130 communicates with a correspondent node according to a predetermined Wireless Local Area Network (WLAN) standard. For this, the wireless communication module 130 comprises a wireless network card (not shown). The wireless communication module 130 communicates in an ad-hoc mode or an infrastructure mode according to a user's selection. In the infrastructure mode, the wireless communication module 130 establishes a communication link with a neighboring access point (AP) to perform a communication. If a plurality of APs supporting different WLAN standards is provided, at least two APs communicate with the wireless communication module 130 in cooperation with each other.

The input unit 110 receives various selection signals from a user. The user inputs a mode selection signal using a variety of button keys provided on a body of the wireless terminal device to select one of the ad-hoc mode and the infrastructure mode. The button keys comprise a number key, a direction key, and an enter key. The input unit 110 transmits the mode selection signal to the central processing unit 120.

When an operation mode is selected through the input unit 110, the wireless communication module 130 performs a communication in the selected operation mode according to the various types of WLAN standards. Among the WALN standards, the IEEE 802.11b, 802.11g, and 802 11a are usually used. The IEEE 802.11b has a maximum data rate of 11 Mbps and operates in the 2.4 GHz frequency band. The IEEE 802.11g amendment to the IEEE 802.11b has a maximum data rate of 54 Mbps and operates in the 2.4 GHz frequency band. The IEEE 802.11a is an extension version of the existing WLAN standard, and has a data rate of 54 Mbps or more and operates in the 5 GHz frequency band. Since the IEEE 802.11b and the IEEE 802.11g have the same frequency band of 2.4 GHz, they are compatible with each other. Accordingly, if the wireless communication module 130 communicates according to the IEEE 802.11b but a surrounding environment communicates according to the IEEE 802.11g, interference occurs therebetween.

In order to prevent the interference, the following process is performed. When a mode selection signal to change the operation mode is received through the input unit 110, the central processing unit 120 searches for a standard having a different frequency band from that of a first WLAN standard used in the surrounding environment. If a second WLAN standard is searched, a communication profile for the second WLAN standard is retrieved from the memory 140. The wireless communication module 130 establishes a communication link with a certain correspondent node according to the second WLAN standard based on the retrieved communication profile. The correspondent node may comprise a wireless terminal device such as a laptop computer, a personal computer (PC), a personal digital assistant (PDA) and a network printer in the ad-hoc mode or it may be an access point in the infrastructure mode.

The communication profile information about the plurality of WLAN standards for use by the wireless communication module 130 is input by a user in advance and stored in the memory 140. The communication profile information comprises at least one of a service set identification (SSID), WLAN standard information, operation mode information, authentication information and encryption information. The output unit 150 displays a user interface window for a user to input the communication profile information.

Figure 3:
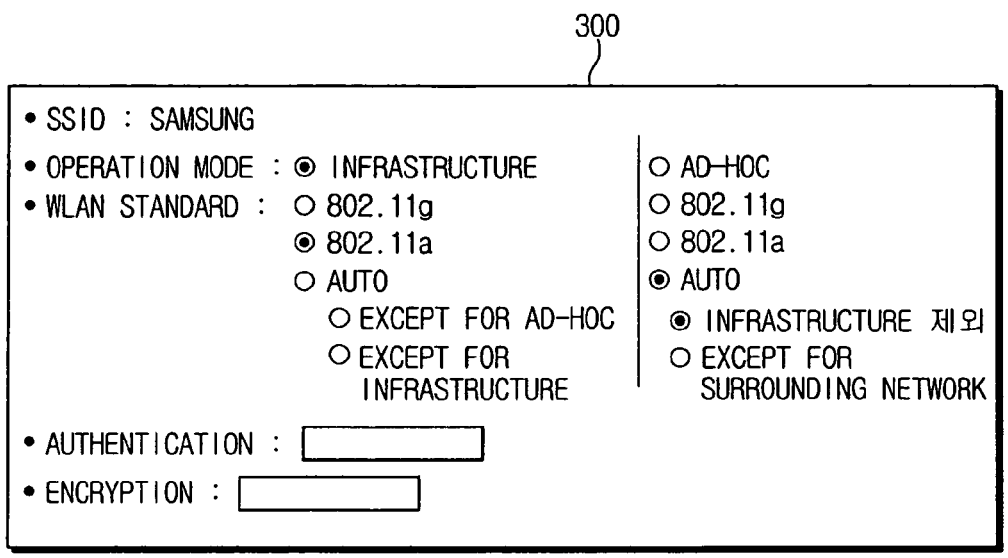
FIG. 3 is a view illustrating a user interface window for determining a communication profile of a wireless terminal device according to an exemplary embodiment of the present invention.

FIG. 3 is a view illustrating one example of the user interface window 300 for setting a communication profile. In FIG. 3, the SSID comprises an ID that is allocated to differentiate the present wireless terminal device from the correspondent node. The authentication information and the encryption information maintain security in communicating with the correspondent node.

The operation mode information selects one of the infrastructure mode and the ad-hoc mode. In the infrastructure mode, a WLAN standard suitable to an intended access point for connection is selected. Also, a WLAN standard for the ad-hoc mode can be selected.

In this case, a WLAN standard for a current operation mode is automatically selected by referring to a WLAN standard in a different operation mode. That is, if an "auto-setting" is selected to set a WLAN standard for the ad-hoc mode as shown in FIG. 3, an optimal WLAN standard is automatically set by referring to a WLAN standard for the infrastructure mode or a surrounding network condition. In this case, the menu "except for infrastructure" is selected to exclude the WLAN standard for the infrastructure mode, or the menu "except for surrounding network" is selected to exclude a WLAN standard used in the surrounding network.

For example, it is assumed that a communication is performed according to the IEEE 802.11a in the infrastructure mode. If the operation mode is changed to the ad-hoc mode and the menu "except for infrastructure" is selected, the WLAN standard except for the standard IEEE 802.11a is searched for the use in the ad-hoc mode. It is preferable to use a standard of different frequency bands. In the above example, the standard IEEE 802.11g or 802.11b uses a different frequency band 2.4 GHz from 5 GHz of the standard IEEE 802.11a.

If the menu "except for surrounding network" is selected, WLAN standards used in network environment located within a communicable range is taken into account, and a WLAN standard having a different frequency band is selected. In the above example, a communication with a first access point is performed according to the standard IEEE 802.11a in the infrastructure mode. Then, if an operation mode is switched to the ad-hoc mode, the standard IEEE 802.11b or 802.11g is selected.

Unlike the above case where a plurality of access points exist, if surrounding terminal devices exist communicating with one another in the ad-hoc mode, the WLAN standard for the surrounding terminal devices are taken into account and different WLAN standards are selected.

Meanwhile, if an operation is switched from the ad-hoc mode to the infrastructure mode, the WLAN standard can be automatically set. That is, if the menu "auto-setting" is selected for the WLAN standard of the infrastructure mode, the WLAN standard is automatically set with reference to a WLAN standard used among surrounding wireless terminal devices or a WLAN standard supported by another access point.

Figure 4:
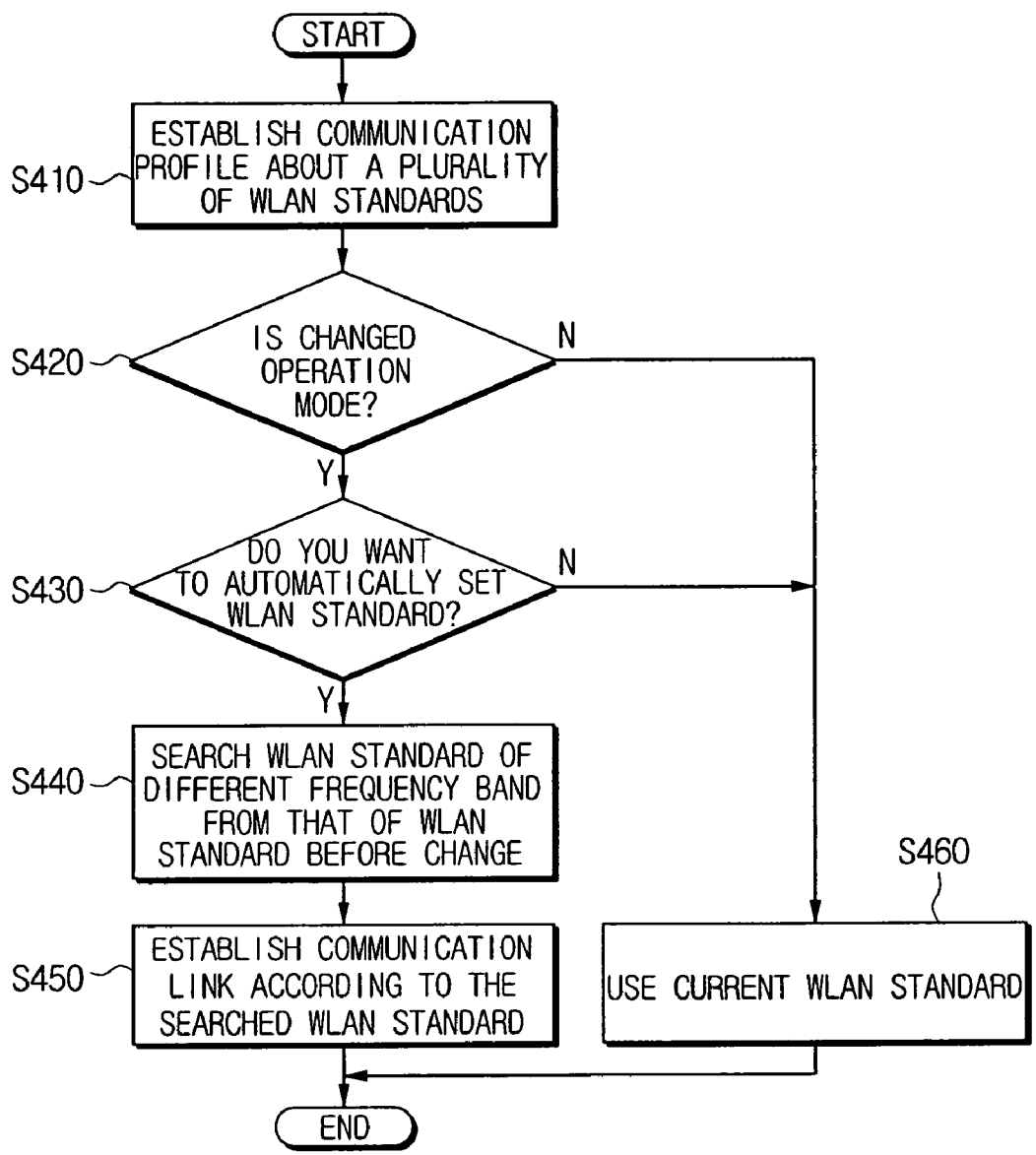
FIG. 4 is a flowchart illustrating a wireless communication method according to an exemplary embodiment of the present invention.

FIG. 4 is a flowchart illustrating a wireless communication method according to an exemplary embodiment of the present invention. Referring to FIG. 4, an user inputs communication profile information about a plurality of WLAN standards through the user interface window at step S410. The input communication profile information is stored to the memory 140.

If it is determined that an operation mode is switched at step S420, it is determined whether the "auto-setting" function of automatically setting the WLAN standard is selected at step S430. Then, if the "auto-setting" function is selected, the type of first WLAN standard which was used before the mode change is determined and a second WLAN standard different from the first WLAN standard are searched at step S440. The second WLAN standard is searched from the plurality of WLAN standards included in the communication profile information input through the user interface window. Preferably, the second WLAN standard uses a different frequency band from that of the first WLAN standard.

A communication link with a certain correspondent node is established according to the searched second WLAN standard at step S450.

Meanwhile, if no change occurs in the operation mode at step S420 or if a change occurs in the operation mode but a WLAN standard automatic setting function is not selected at step S430, the current WLAN standard is still used at step S460.

FIG. 4 illustrates the case where an operation mode is switched to a different other mode. However, when a wireless terminal device tries an initial communication, a WLAN standard can be selected with reference to the WLAN standards for different operation modes.

Figure 5:
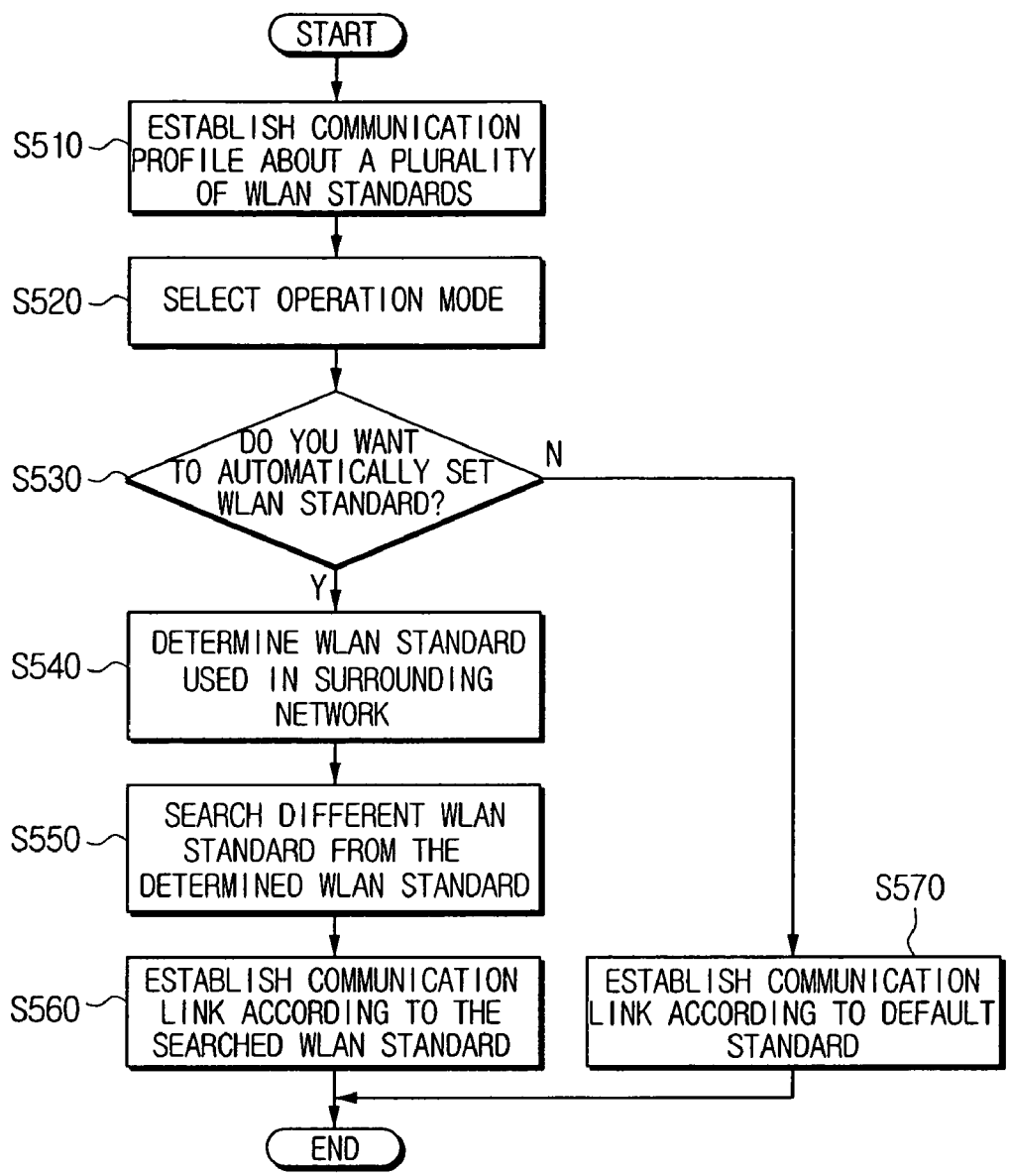
FIG. 5 is a flowchart illustrating a wireless communication method according to an exemplary embodiment of the present invention.

FIG. 5 is a flowchart illustrating a wireless communication method according to an exemplary embodiment of the present invention. Referring to FIG. 5, communication profile information relating to a plurality of WLAN standards is set at step S510. If a predetermined operation mode is selected at step S520, it is determined whether the menu "auto-setting" is selected at step S530.

If the menu "auto-setting" is selected, a WLAN standard used in surrounding network existing within a communicable range is determined at step S540. Then, a different type of WLAN standard from that of the determined WLAN standard is searched at step S550, a communication link is established according to the searched WLAN standard at step S560.

If the menu "auto-setting" is not selected, a communication link is established according to a WLAN standard set to be a default at step S570.

The embodiment explained in FIG. 5 can be applied to the case where an operation mode is changed. That is, if an operation mode is changed, a surrounding network condition is taken into account and a WLAN standard for a changed operation mode is determined.

Figure 6:
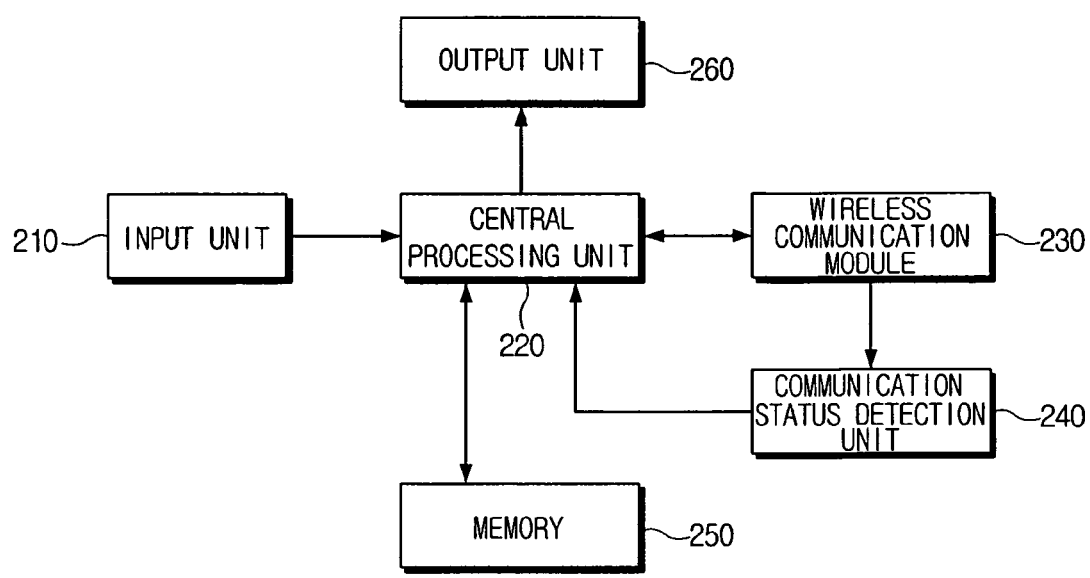
FIG. 6 is a block diagram illustrating a wireless terminal device according to an exemplary embodiment of the present invention.

FIG. 6 is a block diagram illustrating a wireless terminal device according to an exemplary embodiment of the present invention. Referring to FIG. 6, a wireless terminal device according to an exemplary embodiment of the present invention comprises an input unit 210, a central processing unit 220, a wireless communication module 230, a communication status detection unit 240, a memory 250, and an output unit 260.

The input unit 210 is input with various types of selection signals from a user and transmits the signals to the central processing unit 220. The user inputs information about communication profiles for various WLAN standards for use by the wireless communication module 230 or information about condition for change through the input unit 210.

The wireless communication module 230 performs a communication in an infrastructure mode or an ad-hoc mode according to the IEEE 802.11b, 802.11g and 802.11a standards. The wireless communication module 230 may have extra network cards depending on the respective WLAN standards, or may have one integrated card supporting all of the IEEE 802.11a, 802.11b and 802.11g standards.

In order for the wireless communication module 230 to select a certain standard from the WLAN standards, a user has to set a predetermined communication profile. The central processing unit 220 controls the output unit 260 to display a view for setting the communication profile.

Figure 7:
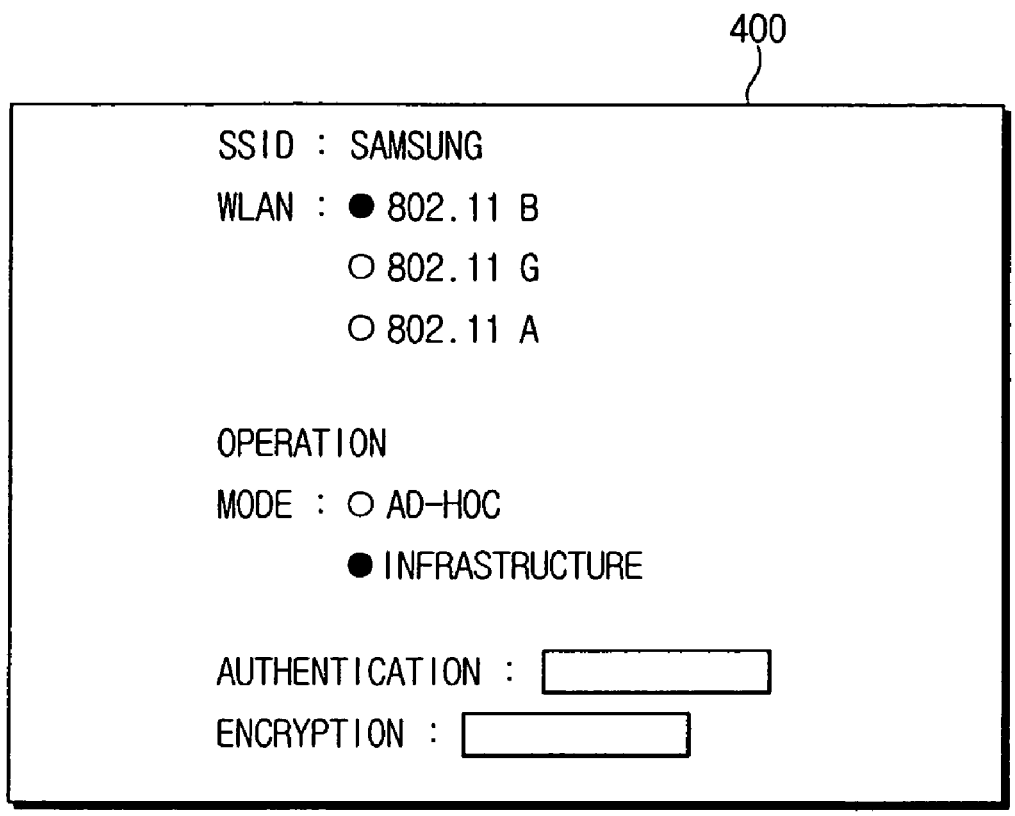
FIG. 7 is a view illustrating an exemplary implementation of a communication profile for a predetermined Wireless Local Area Network (WLAN) standard according to an exemplary embodiment of the present invention.

FIG. 7 is a view illustrating one example of a communication profile setting view 400 displayed through the output unit 260. Referring to FIG. 7, the communication profile comprises a Service Set Identification (SSID), WLAN standard information, operation mode information, authentication information, and encryption information. The SSID refers to an ID that allows the wireless network card to communicate with an AP or another node. The WLAN standard information is to designate one of the WLAN standards that is supportable by the wireless communication module 230. A user selects a WLAN standard based on characteristics of the respective standards. Additionally, the user can select one of operation modes such as an ad-hoc mode or an infrastructure mode, and also determines the authentication information and encryption information for security.

As shown in FIG. 7, if a user determines the communication profiles according to a specific WLAN standard, the central processing unit 220 stores the respective determined profiles in the memory 250.

The central process unit 220 displays a user interface window through the output unit 260 to determine whether to set a WLAN standard automatic change function.

Figure 8:
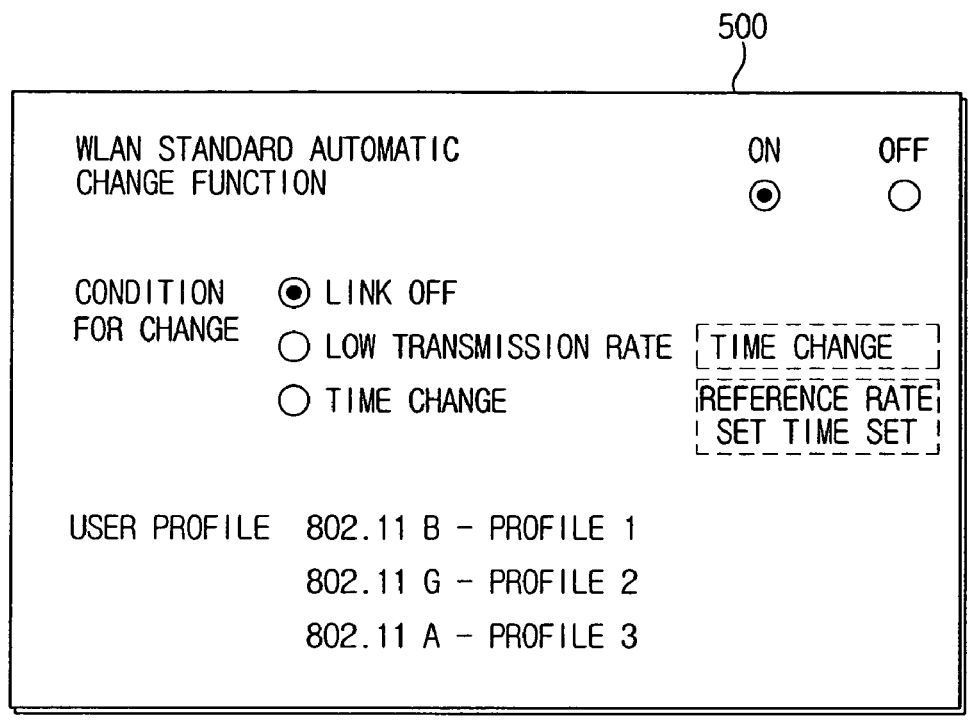
FIG. 8 is a view illustrating an exemplary implementation of a user interface window for determining a WLAN standard automatic change function of the wireless terminal device of FIG. 6.

FIG. 8 is a view illustrating one example of the user interface window displayed through the output unit 260. Referring to FIG. 8, the user interface window 500 shows ON/OFF of a WLAN standard automatic change function, a condition for change, profiles according to the respective standards. If the function of the WLAN standard automatic change is selected (ON), the condition for change has to be set. In this case, the condition for change comprises at least one of a LINK OFF, a low transmission rate, and a time change.

The communication status determination unit 240 detects a current communication status and determines whether an event occur satisfying the set condition for change. More specifically, whether a current link is disconnected, whether a transmission rate is less than a reference rate, or whether a time change is determined.

If the communication status detection unit 240 determines that an event occurs satisfying the condition for change, the central processing unit 220 searches for a different supportable WLAN standard. If an appropriate WLAN standard exists, the central processing unit 220 retrieves the communication profiles for the searched WLAN standard, and controls the wireless communication module 230 based on the retrieved communication profiles to establish a link according to the searched WLAN standard.

Hereinafter, an operation of the wireless terminal device according to an exemplary embodiment of the present invention will be described in detail.

If the LINK OFF is selected as the condition for change, the communication status detection unit 240 determines whether the current communication link is in an off state. If a currently linked AP is lost or if the current communication link is disconnected due to the change of encryption key information, it is determined that an event satisfying the condition for change occurs. Also, if any packet is not transmitted from a correspondent node during a predetermined time or if an acknowledge packet is not received in response to a packet transmitted from the wireless terminal device, it is determined that an event occurs satisfying the condition for change, in other words, the LINK OFF condition. If it is determined that a LINK OFF occurs, the communication status detection unit 240 notify the central processing unit 220.

The central processing unit 220 tests different WLAN standards by using the respective communication profiles stored in the memory 250, and thereby searches for a second WLAN standard. Alternatively, after communication links are established according to the respective WLAN standards, the central processing unit 220 searches for the second WLAN standard according to whether an acknowledge packet is received in response to a transmitted test packet.

If a low transmission rate is selected as the condition for change, a predetermined reference time is set for comparison with the transmission rate. If the reference rate is set to 12 Mbps, the communication status detection part 240 determines that an event occurs satisfying the condition for change when a current transmission rate is less than 12 Mbps. Subsequently, the central processing unit 220 searches for a WLAN standard from the plurality of WLAN standards that may be able to maintain a rate of 12 Mbps or more. If the 802.11g standard having a data rate of 52 Mbps or more is searched, a communication link is established based on the profiles of the 802.11g.

If the time change condition is selected as the condition for change, a user has to pre-designate appropriate WLAN standards to respective times. For example, 802.11b standard is designated for 0 o'clock to 8 o'clock, 802.11a standard is designated for 8 o'clock to 17 o'clock, and 802.11g standard is designated for 17 o'clock to 0 o'clock. When a current time shows 08:01, the communication status detection unit 240 determines that an event occurs satisfying the condition for change. Accordingly, the central processing unit 220 establishes a communication link based on profiles of the 802.11a standard which are designated for 8 o'clock to 17 o'clock.

Figure 9:
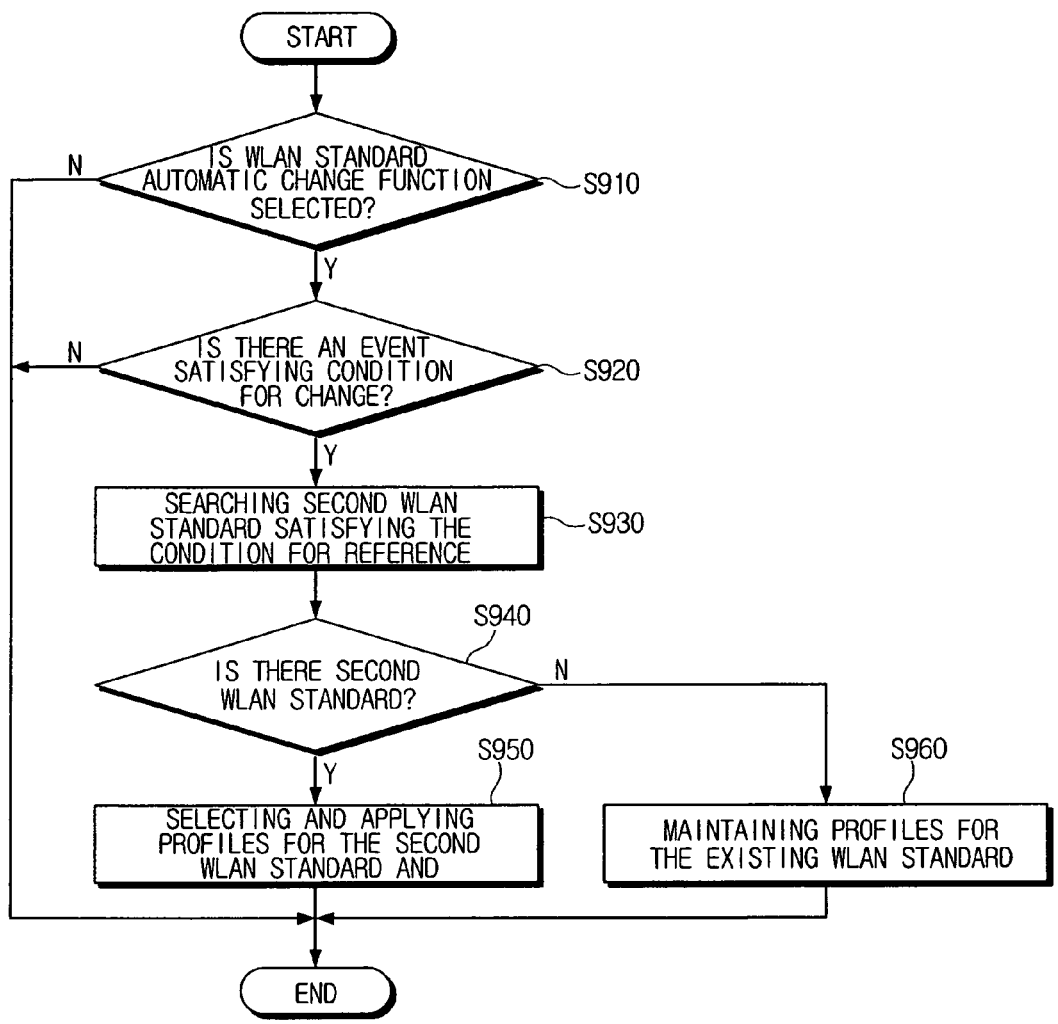
FIG. 9 is a flowchart illustrating a wireless communication method of a wireless terminal device according to an exemplary embodiment of the present invention.

FIG. 9 is a flowchart illustrating a wireless communication method according to an exemplary embodiment of the present invention. Referring to FIG. 9, if the function of WLAN standard automatic change is selected (ON) at step S910, it is determined whether an event occurs satisfying the condition for change at step S920. Since the types of condition for change and the occurrence of an event was described above, they will be omitted.

If it is determined that an event occurs, a user searches for a second WLAN standard not meeting the condition for change in step S930. If the second WLAN standard exists at step S940, profiles for the second WLAN standard are retrieved from the memory 250 and applied to establish a communication link at step S950. Since the detailed descriptions about the communication profiles were made in the above with reference to FIG. 7, they are omitted.

If no second WLAN standard exists, the previous WLAN remains at step S960.

The wireless communication method as described above can be applied to any device that supports the WLAN function such as laptop computers, PCs, network printers, or network multifunction peripheral devices. According to an exemplary embodiment of the present invention, since it is possible to select an appropriate WLAN standard to a current communication environment and perform a communication, a stable communication environment can be established.

According to an exemplary embodiment of the present invention, when an operation mode is changed, interference with a surrounding network can be prevented by changing a current WLAN standard which was used prior to the mode change to a different standard. If an infrastructure mode is changed to an ad-hoc mode, a communication is performed according to a WLAN standard using a different frequency band from that of the previous WLAN standard supported by an access point, and thereby interference can be prevented and thus a radio frequency resource can be effectively utilized. Also, according to an exemplary embodiment of the present invention as described above, in a network where a plurality of WLAN standards coexist, if an event occurs satisfying a pre-set condition for change, a current WLAN standard is automatically changed into a different WLAN standard. Since an appropriate WLAN standard can be selected, a communication status is stably maintained. Also, since a user is not required to set profiles whenever the WLAN standard changes, a user's convenience is improved. The wireless terminal device according to an exemplary embodiment of the present invention may be a laptop computer, a PC, a printer and a multifunction peripheral device having a wireless networking function.

The foregoing exemplary embodiments and advantages are merely exemplary and are not to be construed as limiting the scope of the present invention. The description of embodiments of the present invention is intended to be illustrative, and not to limit the scope of the claims. Many alternatives, modifications, and variations will be apparent to those skilled in the art.

What is claimed is:
1. A wireless terminal apparatus comprising:
 a wireless communication module for establishing a communication link according to a first wireless local area network (WLAN) standard with respect to a correspondent node in an operation mode of at least one of an ad-hoc mode and an infrastructure mode, and for performing a communication with the correspondent node; and a central processing unit for controlling the wireless communication module;

wherein the central processing unit searches a plurality of WLAN standards being different from the first WLAN standard, and wherein if the operation mode of the wireless communication module changes, the first WLAN standard is changed to a second WLAN standard selected from the plurality of WLAN standards being different than the first WLAN and the communication link is established according to the second WLAN standard, wherein the second WLAN standard uses a different frequency band from that of the first WLAN standard.

2. The wireless terminal apparatus as claimed in claim 1, further comprising a key input receiving unit for inputting a mode selection signal to select at least one of the ad-hoc mode and the infrastructure mode.

3. The wireless terminal apparatus as claimed in claim 2, further comprising:
an output unit for displaying an user interface window comprising input for communication profile information relating to the plurality of WLAN standards; and
a memory for storing the communication profile information input through the user interface window.

4. The wireless terminal apparatus as claimed in claim 2, wherein, if a mode is selected by the mode selection signal, the central processing unit determines a WLAN standard used in a network located within a communicable range of the wireless communication module, and employs a different standard from the determined WLAN standard for the second WLAN standard.

5. A method of communicating with a correspondent node in a predetermined operation mode in a wireless terminal apparatus, the method comprising:
determining whether an operation mode is changed;
if the operation mode is changed, determining a first Wireless Local Area Network (WLAN) standard which was used before the operation mode is changed;
searching a plurality of WLAN standards applying a second WLAN standard from among the plurality of WLAN standards being different from the first WLAN standard;
establishing a communication link according to the second WLAN standard different from the first WLAN standard; and
performing a communication using the communication Link,
wherein an operation mode is at least one of and ad-hoc mode and an infrastructure mode, wherein the second WLAN standard uses a different frequency band from that of the first WLAN standard.

6. The wireless communication method as claimed in claim 5, further comprising:
displaying a user interface window for inputting communication profile information relating to the plurality of WLAN standards; and
storing the communication profile information input through the user interface window.

7. The wireless communication method as claimed in claim 6, wherein the applying step further comprises:
retrieving communication profile information relating to the second WLAN standard; and
establishing a communication link according to the second WLAN standard based on the retrieved communication profile.

8. The wireless communication method as claimed in claim 5, further comprising:
receiving a mode selection signal for selecting at least one of an infrastructure mode and an ad-hoc mode;
determining a WLAN standard used in a network existing in a communicable range of the wireless terminal apparatus; and
employing a different standard from the determined WLAN standard for the second WLAN standard.

9. A wireless terminal apparatus comprising:
a memory for storing information comprising communication profiles for a plurality of Wireless Local Area Network (WLAN) standards and information of a plurality of conditions for change;
a wireless communication module for communicating with a correspondent node according to a first WLAN standard; and
a communication status detection unit for detecting a communication status of the wireless communication module and determining whether an event occurs satisfying at least one condition selected by a user among the plurality of conditions for change,
wherein, if the communication status detection unit determines that the event occurs satisfying the condition for change, the wireless communication module searches for a second WLAN standard among the plurality of WLAN standards, changes the first WLAN standard to a second WLAN standard among the plurality of WLAN standards being different than the first WLAN standard and communicates according to the second WLAN standard,
wherein the second WLAN standard uses a different frequency band from that of the first WLAN standard.

10. The apparatus as claimed in claim 9, further comprising an input unit for inputting the information of the communication profiles and the information of the condition for change.

11. The apparatus as claimed in claim 10, further comprising a central processing unit for retrieving communication profiles for the second WLAN standard from the memory, and controlling the wireless communication module based on the retrieved communication profiles to communicate according to the second WLAN standard.

12. The apparatus as claimed in claim 11, wherein, if a communication link off (LINK OFF) condition is selected as the condition for change, the central processing unit searches for the second WLAN standard among the plurality of WLAN standards when the communication LINK OFF condition is satisfied.

13. A wireless terminal apparatus comprising:
a memory for storing information comprising communication profiles for a plurality of Wireless Local Area Network (WLAN) standards and information of a plurality of conditions for change;
a wireless communication module for communicating with a correspondent node according to a first WLAN standard;
a communication status detection unit for detecting a communication status of the wireless communication module and determining whether an event occurs satisfying at least one condition selected by a user among the plurality of conditions for change;

an input unit for inputting the information of the communication profiles and the information of the condition for change; and a central processing unit for retrieving communication profiles for the second WLAN standard from the memory, and controlling the wireless communication module based on the retrieved communication profiles to communicate according to the second WLAN standard, wherein, if the communication status detection unit determines that the event occurs satisfying the condition for change, the wireless communication module searches for a second WLAN standard among the plurality of WLAN standards, changes the first WLAN standard to a second WLAN standard among the plurality of WLAN standards being different than the first WLAN standard and communicates according to the second WLAN standard, wherein, if a low transmission rate is selected as the condition for change and is less than a reference rate, the central processing unit searches for the second WLAN standard from the plurality of WLAN standards that support a transmission rate greater than the reference rate.

14. A wireless terminal apparatus comprising:

a memory for storing information comprising communication profiles for a plurality of Wireless Local Area Network (WLAN) standards and information of a plurality of conditions for change;

a wireless communication module for communicating with a correspondent node according to a first WLAN standard;

a communication status detection unit for detecting a communication status of the wireless communication module and determining whether an event occurs satisfying at least one condition selected by a user among the plurality of conditions for change;

an input unit for inputting the information of the communication profiles and the information of the condition for change; and a central processing unit for retrieving communication profiles for the second WLAN standard from the memory, and controlling the wireless communication module based on the retrieved communication profiles to communicate according to the second WLAN standard, wherein, if the communication status detection unit determines that the event occurs satisfying the condition for change, the wireless communication module searches for a second WLAN standard among the plurality of WLAN standards, changes the first WLAN standard to a second WLAN standard among the plurality of WLAN standards being different than the first WLAN standard and communicates according to the second WLAN standard, wherein, if a time change condition is selected as the condition for change and a time is changed, the central processing unit changes the first WLAN standard into the second WLAN standard, wherein the second WLAN standard is designated to a current time according to information about WLAN standards respectively designated to different times.

15. The apparatus as claimed in claim 11, further comprising an output unit which displays a user interface window for setting at least one of the information of the communication profiles and the information of the condition for change.

16. The apparatus as claimed in claim 15, wherein the information of the communication profiles comprises at least one of Service Set Identification (SSID), WLAN standard information, operation mode information, authentication information and encryption information.

17. A wireless communication method comprising:

performing a wireless communication with a correspondent node according to a first Wireless Local Area Network (WLAN) standard;

detecting a wireless communication status and determining whether an event occurs satisfying at least one condition selected by a user among a plurality of conditions for change;

if the event occurs, searching a plurality of WLAN standards changing the first WLAN standard into a second WLAN standard from the plurality of WLAN standards the second WLAN standard being different than the first WLAN standard; and performing a wireless communication according to the second WLAN standard, wherein the second WLAN standard uses a different frequency band from that of the first WLAN standard.

18. The method as claimed in claim 17, wherein the step of changing comprises:

retrieving communication profiles for the second WLAN standard from a plurality of WLAN standards.

19. The method as claimed in claim 18, further comprising receiving and storing information of communication profiles for the plurality of WLAN standards and information on the event.

20. The method as claimed in claim 19, wherein the information of the communication profiles comprises at least one of Service Set Identification (SSID), WLAN standard information, operation mode information, authentication information and encryption information.

21. The method as claimed in claim 19, wherein the event comprises at least one of a link off, a low transmission rate and a time change.

* * * * *